(12) United States Patent
Tumler

(10) Patent No.: US 9,102,040 B2
(45) Date of Patent: Aug. 11, 2015

(54) LOW FREE FORMALDEHYDE PHENOLIC RESINS FOR ABRASIVE PRODUCTS

(75) Inventor: Armin Tumler, Mautern (AT)

(73) Assignee: Dynea Chemicals Oy, Helsinki (FI)

( * ) Notice: Subject to any disclaimer, the term of this patent is extended or adjusted under 35 U.S.C. 154(b) by 33 days.

(21) Appl. No.: 13/876,489

(22) PCT Filed: Sep. 30, 2011

(86) PCT No.: PCT/EP2011/067181
§ 371 (c)(1),
(2), (4) Date: Mar. 28, 2013

(87) PCT Pub. No.: WO2012/042040
PCT Pub. Date: Apr. 5, 2012

(65) Prior Publication Data
US 2013/0232884 A1      Sep. 12, 2013

(30) Foreign Application Priority Data

Oct. 1, 2010   (GB) .................................. 1016565.2

(51) Int. Cl.
*B24D 3/28*    (2006.01)
*C08G 8/28*    (2006.01)
*C09G 1/02*    (2006.01)

(52) U.S. Cl.
CPC *B24D 3/285* (2013.01); *C08G 8/28* (2013.01); *C09G 1/02* (2013.01)

(58) Field of Classification Search
CPC ............. B24D 3/285; C08G 8/28; C09G 1/02
USPC ........................................................ 523/303
See application file for complete search history.

(56) References Cited

U.S. PATENT DOCUMENTS

| | | |
|---|---|---|
| 5,708,121 A | 1/1998 | Parks |
| 5,795,934 A | 8/1998 | Parks |
| 6,362,275 B1 | 3/2002 | Mani et al. |
| 6,608,162 B1 | 8/2003 | Chiu et al. |
| 2002/0054994 A1 | 5/2002 | Dupre et al. |
| 2003/0096937 A1* | 5/2003 | Ingram et al. .................... 528/86 |
| 2009/0181260 A1* | 7/2009 | Verma et al. .................. 428/524 |
| 2013/0183524 A1 | 7/2013 | Roncuzzi et al. |

FOREIGN PATENT DOCUMENTS

| | | |
|---|---|---|
| CN | 103221443 A | 7/2013 |
| JP | 53029356 A | 3/1978 |
| JP | 4351617 A | 12/1992 |
| KR | 20050099216 A | 10/2005 |
| WO | 99/32534 A1 | 7/1999 |
| WO | 2009040415 A1 | 4/2009 |
| WO | 2009073703 A2 | 6/2009 |

OTHER PUBLICATIONS

GB Search Report issued on Jan. 31, 2011.
International Search Report issued on Nov. 15, 2011.

* cited by examiner

*Primary Examiner* — John Uselding
(74) *Attorney, Agent, or Firm* — Ramin Amirsehhi; David P. Owen; Hoyng Monegier LLP

(57) ABSTRACT

The present invention provides process for the manufacture of an aqueous resin composition comprising a phenolic formaldehyde (PF) resin, which process comprises the steps of providing a formaldehyde and phenolic compound, reacting the compounds in a condensation reaction in the presence of a catalyst, after completion of the condensation reaction to react with free formaldehyde, determining the free formaldehyde content of the resin composition, adding a pre-calculated substantially stoichiometric amount of modifying compound containing a primary amine group to reduce the amount of free formaldehyde in the resin composition to less than 0.1 wt % (relative to the total weight of the aqueous resin composition), and optionally distillation of the reaction product.

7 Claims, No Drawings

LOW FREE FORMALDEHYDE PHENOLIC RESINS FOR ABRASIVE PRODUCTS

CROSS REFERENCE TO RELATED APPLICATIONS

This application is a US National Stage under 35 USC 371 of international application number PCT/EP2011/067181 filed on Sep. 30, 2011 and claims priority from GB application No. 1016565.2 filed on Oct. 01, 2010, the contents of both applications are hereby incorporated by reference in their entirety.

BACKGROUND OF THE INVENTION

1. Field of the Invention

The invention relates generally to a low free formaldehyde phenolic resin composition in particular for use in abrasive products. The invention further relates to abrasive products comprising abrasive particles fixed in a resin, in particular coated abrasives and molded abrasives, and to a method for manufacturing the phenolic resin composition and to processes for making said in abrasive products.

2. Description of the Related Art

Coated abrasives are flexible products, used in forms of sheets, belts, mop discs, flap discs etc. These products are used for sanding plywood and fiber boards, wood and paints, grinding and finishing metal, glass, plastics etc. The abrasive grains are fixed in a single layer by a binder on a backing material, which can be paper, natural or synthetic fabrics vulcanized fibers and others. The main binders are phenolic resins, urea resins and also animal glue is still in use.

Bonded abrasives are grinding tools, where the abrasive grains are fixed by a binder in a defined shape like wheels, segments, blocks etc. We can distinguish between two main types of binder, vitrified or resin bonded. For the resin bonded grinding tools mainly phenolic resins are used, with and without fillers and additives. These products are used for sanding, grinding, cutting and polishing. The choice of the resin for the binder in general depends on the application of the abrasives. Mainly phenolic resins are used, when heat resistance a high grinding performance like high stock remove and long lifetime are required. For less demanding performance urea resins and also animal glue are used. Phenolic and urea resins have the disadvantage of a relatively high formaldehyde emission. For special purposes, such as wet grinding, epoxy, urethane or alkyd resins are applied.

Because of the good performance in abrasive products, the demand in abrasive products based on PF resins is increasing more and more. A problem of PF resins is that they contain relatively high amounts of unreacted free phenol and free formaldehyde monomers, which poses safety, health and environmental problems. Low free phenol content has been in demand already for several years for environmental reasons. In the last 2 years it has also become a requirement to have low free formaldehyde content, because formaldehyde has been considered carcinogenic by the IARC. The combination low free phenol and low free formaldehyde by maintaining specific resin properties is quite difficult to achieve. Low free phenol is preferably less than 10% and typically between 2 and 5 weight %, and low free formaldehyde is preferably less than 0.5 weight % and typically less than 0.1 weight %. The usually applied formaldehyde scavenger additives like urea and melamine are limited in their amount of addition, because higher amounts can cause precipitation, reduced storage stability and processing problems of the resin.

WO2009073703, describes a phenolic resin for use in coated abrasive products having a relatively low free formaldehyde content formulation formed by reacting a basic catalyst, formaldehyde, water and a phenol to form an intermediate composition to which an alkanolamine is subsequently added. The alkanolamine is added in excess to react away the formaldehyde. Further, alkanolamine has a strong negative impact on water tolerance and increases volatiles in the resin.

Thus the problem to be solved is to provide a process of manufacture of a resin composition having further reduced free formaldehyde and low free phenol content without significant reduction of resin properties, storage stability and performance in the envisaged application in abrasive products.

BRIEF SUMMARY OF THE INVENTION

The present invention addresses the aforementioned problems by providing a process for the manufacture of an aqueous resin composition comprising a phenolic formaldehyde (PF) resin, which process comprises the steps of
  (a) providing a formaldehyde and phenolic compound,
  (b) reacting said compounds in a condensation reaction in the presence of a catalyst,
  (c) after completion of the condensation reaction to react with free formaldehyde, determining the free formaldehyde content of the resin composition,
  (d) adding a pre-calculated substantially stoichiometric amount of modifying compound containing a primary amine group to reduce the amount of free formaldehyde in the resin composition to less than 0.1 wt % (relative to the total weight of the aqueous resin composition), and
  (e) optionally distillation of the reaction product.

The process according to the invention results in a resin composition with a free formaldehyde content of less than 0.1 wt %.

The phenolic compounds are hydroxy (poly)aromatic compounds, in particular phenol, resorcinol and cresol, and wherein the aldehyde compounds are compounds of the general formula RC(=O)H, wherein R is preferably hydrogen, but can also be another substituted or unsubstituted hydrocarbon, like acetaldehyde, benzaldehyde; or any difunctional aldehyde.

Modifying compounds according to the claimed invention were found to solve the problems of ensuring reduced free formaldehyde and low free phenol content without significant reduction of resin properties, storage stability and performance in the envisaged application in abrasive products. Modifying compounds in the context of the instant application are compounds containing a primary amine group that are added in substantially stoichiometric amounts to condensation reactions and/or condensation reaction products that may not substantially change the characteristics of a resin, but modify the resin in such a way that the level of free formaldehyde released from the resulting product is reduced. In other words, the modifying compounds can be considered free-formaldehyde reducing additives. Examples of suitable modifying compounds are glycine and hydroxylamine. Hydroxylamine is an analytical reagent for determination free formaldehyde in resins. It is fully compatible with water based PF resins and it does not change the characteristics of the resin or deteriorate the storage stability. The level of free formaldehyde can be achieved to <0.1% wt %.

Advantageously, the modifying compounds of the present invention are added in substantially stoichiometric amounts to reduce the amount of free formaldehyde in the resin composition to at least less than 0.1 wt % (relative to the total weight of the aqueous resin composition). In one embodiment, the amount of modifying compound over at the end of the reaction is less than 1 wt %, preferably less than 0.5 wt %, more preferably less than 0.2 wt % and most preferably less than 0.1 wt %.

The advantage of using modifying compounds of the claimed invention to reduce the free formaldehyde in PF resins is, that the level of free formaldehyde of <0.1 wt % relative to the total weight of the aqueous resin composition can be achieved. No additional reaction time after addition required. In one embodiment, the modifying compound can be added after the condensation reaction between the formaldehyde and phenolic compound and before during or after distillation of the reaction product.

Advantageously, the modifying compound has a solubility in water at 20° C. of at least 25 g/L and preferably at least 50 g/L.

In one embodiment, the modifying compound comprises at least one of the formula:

wherein R is selected from the group consisting of: —OH (hydroxy), —(C=O)—R$^1$ (amides), R$^1$—(C=O)—NH— (hydrazides), —CH$_2$—CH$_2$—SO$_3$H (taurines), —N(R$^2$)R$^3$ (hydrazines), —CH$_2$(COOH), —CH(COOH)(CH$_2$OH), —CH(COOH)(CH$_2$SH), —CH(COOH)(CH$_3$), —CH(COOH)(CH$_2$CH$_2$CONH$_2$) (amino acids), and the salts thereof, wherein R$^1$, R$^2$, and R$^3$ are independently selected from the group consisting of substituted or unsubstituted alkyl, aryl, or H.

In another embodiment, the modifying compound is selected from the group of primary amines comprising a secondary amine, hydrazines, taurines, aminosulfuric acid or a hydrazide and their salts.

In yet a further embodiment, the modifying compound comprises at least one of: the modifying compound comprises one or more amino acids, preferably isoleucine, glutamine, alanine, valine, lysine, arginine, histidine, methionine, threonine, glycine, serine, cysteine, and their salts.

The solubility of various acids in water at 20° C. is shown in the following table:

TABLE 2

| NAME | FORMULA | Solubility in water at 20° C. (g/L) |
|---|---|---|
| Glycine | NH$_2$CH$_2$COOH | 249 |
| Alanine | CH$_3$CH(NH$_2$)COOH | 166 |
| Serine | HO$_2$CCH(NH$_2$)CH$_2$OH | 360 |
| Cysteine | HO$_2$CCH(NH$_2$)CH$_2$SH | 280 |
| Glutamine | C$_5$H$_{10}$N$_2$O$_3$ | 26 |
| Taurine | C$_2$H$_7$NO$_3$S | 63 |
| Valine | HO$_2$CCH(NH$_2$)CH(CH$_3$)$_2$ | 85 |
| Arginine | C$_6$H$_{14}$N$_4$O$_2$ | 150 |
| Leucine | O$_2$CCH(NH$_2$)CH$_2$CH(CH$_3$)$_2$ | 24 |
| Threonine | HO$_2$CCH(NH$_2$)CH(OH)CH$_3$ | 90 |
| Asparagine | C$_4$H$_8$N$_2$O$_3$ | 4 |
| Tryosine | C$_9$H$_{11}$NO$_3$ | 0.38 |

The surprising effect of modifying compounds according to the present invention, such as hydroxylamine, and the advantage over alkanolamine, is that modifying compounds can be added in calculated quantities to the resin to get the required free formaldehyde by one addition, thanks to the well defined reaction.

For example, the use of alkanolamine in equimolar amounts to the free formaldehyde does not give the low value <0.1 wt % free formaldehyde (see results in table 2 in the Detailed Description), so an additional amount has to be added after measuring the free formaldehyde and maybe another time again to achieve the low value. The procedure with alkanolamine is therefore time consuming and complicated. Another big advantage of modifying compounds like hydroxylamine is that resin properties do not change after addition, whereas using alkanolamine has strong negative impact on water tolerance and increases the volatiles in the resin by giving lower solid content.

The molar ratio of formaldehyde to phenolic compound is between 0.9 and 3.0, preferably between 1.2 and 2.5 and most preferably between 1.5 and 2.1. even for higher molar F/P ratio PF resins, particularly between 1.5 and 2.1, free formaldehyde of <0.1 wt % weight relative to the total weight of the aqueous resin composition can be achieved by having low free phenol at same time. No impact on resin characteristics, quantity of additive to add can be calculated, no surplus is required.

Normal state-of-the-art PF resins can be used in the resin composition according to the invention. The type of PF resin or the type of process for preparing to PF resin may vary depending on the envisaged end use. For example, the concentration of the starting materials can vary, phenol can be used in concentration of 100% or diluted with water, the concentration of sodium hydroxide can be different and formaldehyde can also be used in various concentrations or even in solid form as paraformaldehyde. Theoretically, also other types of aldehydes like acetaldehyde can be used.

In one embodiment, the reaction according to the present invention comprises the steps of
  (a) providing a phenolic compound and a formaldehyde compound with a base catalyst in water according to the process of the present invention,
  (b) reacting the compounds at elevated temperature, preferably between 50 and 100° C.,
  (c) optionally cooling the resulting reaction product to a temperature below 50° C.,
  (d) optionally distilling to concentrate the resin,
  (e) adding the modifying compound before during or after step c) or d), and
  (f) optionally reacting the modifying compound between 45-65° C. for 15-60 minutes, preferably between 30-60 minutes.

Also various types of catalysts can be used. In one embodiment, the catalyst comprises at least one of: lithium hydroxide, potassium hydroxide, barium hydroxide, calcium hydroxide, sodium hydroxide and mixes thereof or an organic catalyst comprising at least one of ammonia and an amine.

The resins can have molar ratio (amount of formaldehyde to phenol) usually between 0.9-3, preferably between 1.2 and 2.5 and most preferably between 1.5 and 2.1.

The amount of hydroxylamine used to bind the free formaldehyde in the resin is between 0 and 10 weight percent, preferably between 0.2 and 8.0 weight percent, and most preferably between 0.5 and 5 weight percent of the aqueous resin solution.

For glycine the amount used is between 0 and 5 weight percent, preferably between 0.2 and 3.0 weight percent, and more preferably between 0.3 and 2 weight percent of the aqueous resin solution.

The use of the aqueous resin composition according to the present invention includes in the production of coated or bonded abrasive products, nonwoven fiber products, mineral wool products, glass- and stonewool products, decorative surface products, paper overlay products, foams, filters, foundry and composites. The present invention can further provide abrasive products, in particular bonded abrasives and coated abrasives, comprising abrasive grains and a bonding material obtained from the resin.

A typical manufacturing process of coated abrasives starts with the unwinding of the backing material from a roll with a width up to 2 m and the introduction in a coating machine. Here, the first layer of the binder, the so called "maker" is applied by rolls. The thickness of the resin layer is adjusted according the size of the abrasive grains to be fixed, coarse grains require a thick, fine grains a thin layer. The abrasive grains, corundum or silicon carbide, are sprinkled on the resin by gravity or better by an electrostatic field, in which the grains are accelerated and projected into the maker coat. This provides an optimum of orientation of the grains for good grinding performance.

The subsequent drying and pre-curing of the first resin layer with the abrasive grit in a drying tunnel allows fixing the grit in this position. The temperature and time in the drying program must be perfectly controlled and depends on the type of product, the amount, reactivity and viscosity of the binder and the size of the grains to achieve a perfect drying without blistering. After drying the second resin layer, called "sizer" can be applied to bind the grains well to the substrate. Curing is carried out in a long drying tunnel, where the coated abrasives are transported through zones of different drying temperatures. At the end the product is wound up in large rolls, called jumbo. In the case where the curing achieved in the tunnel is not sufficient (i.e. short tunnel or high production speed etc), posturing of the jumbo rolls is done in a curing oven.

After the final curing the coated abrasives are stored in a climate chamber, to recover the natural moisture level and get better flexibility of the backing. The material is still too rigid for use, so it is necessary to flexibilize it. The sheets are bent sharply on steel rollers or steel blades around the uncoated side, to create numerous cracks in the resin layers to reach a sufficient flexibility of the final product. In the cutting operation, the coated abrasives are cut in different shapes and sizes and are prepared to be used as belts, fiber discs, sheets, mop discs etc.

The resin composition may comprise apart from the phenolic formaldehyde resin binder, additives and fillers like calcium carbonate, dolomite, kaolin or cryolite etc added to the resin in amounts depending on the grit size to be fixed. The purpose is to reach proper viscosity especially when thicker coatings are applied for coarse grains, reduce shrinkage and cracking, lower the binder costs, increase bond strength and performance. The properties of the phenolic resins used as the binder in abrasive applications can vary widely depending on the desired final properties and performance. The skilled artisan knows how to choose for example the reactivity and curing speed of the resin, the monomer content and the viscosity range in view of the envisaged application.

The process of manufacturing bonded abrasives, such as grinding wheel consists of 3 main steps. The first step is the preparation of the abrasive mix, the second the pressing of the wheel and the third step the curing of the wheel. The mixing process starts with mixing the abrasive grains with liquid phenolic resin, to create a thin resin layer on the grains. The wet grains are poured into a second mixer, where phenolic powder resin with the hardener and fillers are prepared and mixed, to glue the powder particles on the grains. Mixing is continued, until a homogeneous, free flowing mix is achieved.

In the next step, the free flowing mix is poured into a round mould and homogeneously distributed to avoid unbalance and pressed to defined density or dimension. The green wheel is un-moulded and carried to the oven.

In the third step, the green uncured grinding wheel is put into the oven and cured at defined temperature. Normally a curing cycle is applied with increasing temperature from room temperature up to 160-210° C., where the time, the temperature gradient and final temperature are functions of the dimension of the grinding wheel and the end use of the wheel.

DETAILED DESCRIPTION

The invention will be illustrated below by examples. It will be recognized that the embodiments in the examples are susceptible to various modifications and alternative forms well known to those of skill in the art.

EXAMPLES

Preparation of PF Resins With Low Free Formaldehyde

To demonstrate the advantages of the present invention, several resins have been prepared without and with modification, based on the same basic formulation and procedure. This procedure is described in the following example without modification. The other resins are prepared in the same way, but after the condensation, the modifying agent is added to the reaction product with subsequent distillation, to adjust the resin to the final viscosity.

Example 1

Comparative Resin Without Additive, Molar Ratio F/P=2

1000 g phenol (10.626 mol) and 40 g of a 50% aqueous solution of sodium hydroxide are charged to a reactor, equipped with a stirrer and a heating/cooling unit. The mixture is heated up to 60° C. and 1250 g of a 51% aqueous solution of formaldehyde (21.228 mol) is added continuously during 1.5 hours under stirring. The temperature is allowed to rise to 80° C. and maintained. After addition of formaldehyde is complete, the resin is condensed at 80° C. for about 2 hours to a water tolerance (ISO 8989) at 23° C. of 3:1 (ml water/g resin). The resin is distilled under vacuum to the final viscosity. The results of the analysis are listed in Table 2.

Example 2

Inventive Example, Adding Hydroxylamine

The resin is prepared according to example 1 until the end of condensation. When water tolerance of 3:1 (ml water/g resin) is reached, the resin is cooled down to 30° C., a sample is taken and the free formaldehyde content is measured according to ISO 9397. The value found is 2.02%, which corresponds to a total amount of 46.26 g free formaldehyde (1.54 mol) in the resin solution. An equimolar amount of a 50% aqueous solution of hydroxylamine of 101.64 g (1.54 mol) is added and distillation under vacuum is started. The resin is distilled to the final viscosity. The amount of hydroxylamine in the resin is 2.42% weight of the aqueous resin solution. The results of the analysis are listed in Table 2.

Example 3

Inventive Example, Adding Glycine

The resin is prepared according to Example 1 until end of condensation. When water tolerance of 3:1 (ml water/g resin) is reached, the resin is cooled down to 30° C., a sample is taken and the free formaldehyde content is measured according to ISO 9397. The value found is 1.8%, which corresponds to a total amount of 41.22 g free formaldehyde (1.372 mol) in the resin solution. 65.76 g glycine (0.876 mol) is added to the resin, stirred and heated up to 60° C. and kept at 60° C. for 1 h, then distillation under vacuum is started. The resin is distilled to the final viscosity. The amount of glycine in the resin is 3.23% weight of the aqueous resin solution. The results of the analysis are listed in Table 2.

Example 4

Comparative Example, Adding Urea

The resin is prepared according to Example 1 until end of condensation. When water tolerance of 3:1 (ml water/g resin) is reached, the resin is cooled down to 30° C., a sample is taken and the free formaldehyde content is measured according to ISO 9397. The value found is 1.95%, which corresponds to a total amount of 44.65 g free formaldehyde (1.486 mol) in the resin solution. 120 g urea (1.998 mol) is added to the resin, stirred and heated up to 60° C. and kept at 60° C. for 1 h, then distillation under vacuum is started. The resin is distilled to the final viscosity. The amount of urea in the resin is 5.91% weight of the aqueous resin solution. The results of the analysis are listed in Table 2.

Example 5

Comparative Example, Adding Monoethanolamine (MEA)

The resin is prepared according to Example 1 until end of condensation. When water tolerance of 3:1 (ml water/g resin) is reached, the resin is cooled down to 30° C., a sample is taken and the free formaldehyde content is measured according to ISO 9397. The value found is 1.7%, which corresponds to a total amount of 38.93 g free formaldehyde (1.296 mol) in the resin solution. 79.17 g monoethanolamine (1.296 mol) is added to the resin and distillation under vacuum is started. The resin is distilled to the final viscosity. The amount of MEA in the resin is 3.9% weight of the aqueous resin solution. The results of the analysis are listed in Table 2. In an extra trial an additional amount of 1.2% of monoethanolamine was added to the resin, to see, how much of MEA is required, to achieve free formaldehyde of 0.1% weight of the aqueous resin solution.

TABLE 2

| results of the analysis | | | | | |
| --- | --- | --- | --- | --- | --- |
| | Example 1 | Example 2 | Example 3 | Example 4 | Example 5 |
| Viscosity (ISO 3219) at 20° C. (mPas) | 3280 | 3090 | 3100 | 3150 | 3040 |
| Solid content (ISO 3251) (%) | 77.3 | 77.4 | 75.4 | 76.1 | 73.5 |
| pH (ISO 8975) | 9 | 8.9 | 8.3 | 8.8 | 9.2 |
| Free formaldehyde (ISO 9397) (%) | 2.3 | <0.1 | <0.1 | 0.4 | 0.5 |
| Water tolerance (ISO 8989) (ml water/g resin) | 3.9 | 3.9 | 3.7 | 3.3 | 1.1 |
| Free phenol (ISO 8974) (%) | 2.2 | 3.1 | 1.5 | 1.9 | 1.8 |
| Gel time 100° C. (ISO 9396 B) (min) | 35 | 32 | 35 | 37 | 32 |
| Modification | — | hydroxylamine | glycine | urea | monoethanolamine |

In this table important quality parameters for the phenolic resins are listed. This allows for a comparison of the unmodified resin properties to with these of the modifying compounds in them.

The viscosity is normally required from the producer of coated abrasives in a defined range and the resin is produced accordingly, distillation of the resin is continued, until the required range is achieved.

The solid content gives some information about the volatile components in the resin, like water, phenol etc. It is considered as a characteristic property for each resin. Free formaldehyde and free phenol content give the information about the remaining monomers after the reaction in the resin and for safety, health and environmental reasons, the trend goes more and more to low monomer resins.

The water tolerance gives the information about the compatibility of the resin with water. A great part of producers of coated abrasives demand high water tolerance (i. e. 2-4 ml water/g resin or higher), first to be able to add enough water to the resin and the mixture with fillers and additives to adjust the right viscosity for the production process, second for the cleaning process of the production line and third because the water tolerance will be further reduced during the storage time. Mostly water is used to clean the parts of the production line, contaminated with resin, while flammable solvents (i.e. ethanol, methanol) are mostly strictly forbidden for security and environmental reasons. Therefore a modification, where the water tolerance is reduced to low values (around 1 ml water/g resin or even lower) is not suitable for the reasons mentioned above. The gel time is a parameter, to describe the reactivity of the resins and gives some information about the curing speed at higher temperature.

Example 1 is the reference resin without any modification, with which we compare the other resins and their properties. The high free formaldehyde content of Example 1 makes it unsuitable for use today for reasons we have already explained. The other resins are based on the same production technology, with further modification of the resin composition after condensation, to reduce the free formaldehyde content in the final resin. The different modifications used in the other resins from Example 2 to Example 5 have more or less impact on the resin properties, as shown in Table 2. The target of the invention was, to find an easy to use modification of the resin, to be able to reach the value <0.1% free formaldehyde and to maintain the initial properties of the resin as much as possible.

This target can be reached by using hydroxylamine as modifying agent, as it can be seen by Example 2. It is easy to calculate the required amount of hydroxylamine to reach <0.1 wt % free formaldehyde, it is easy to add the amount of hydroxylamine prior to distillation to the resin composition and the final resin maintains all the initial properties of the unmodified resin in Example 1. The Example 3 with glycine as modifying agent fulfils also the requirement of low free formaldehyde <0.1 wt % and maintains the initial properties of the example 1 to a great extent.

In comparative Example 4 with urea as modifying agent, the target value for free formaldehyde <0.1 wt % could not be reached, even with a high amount of urea. It is known, that high amounts of urea are not favourable at all for a phenolic resin, as the storage stability decreases and precipitation/crystallisation can occur during storage and can make the resin unusable. Also processing problems and reduced performance of resins with high urea content have been experienced.

In comparative Example 5 with monoethanolamine as modifying agent the target value of 0.1 wt % free formaldehyde could not be reached and water tolerance was already at 1.1:1 ml water/g resin and very low. An additional amount of 1.2 wt % of monoethanolamine added to the resin composition, could reduce the free formaldehyde to <0.1 wt %, but resulted in a resin with lower water tolerance below 1:1 ml water/g resin and also higher volatile content and therefore solid content even lower. The fact, that the MEA does not react in clearly defined proportions with the free formaldehyde, makes it much more difficult, to achieve the goal of low free formaldehyde in the process in one step. This is the clear advantage of the invention using hydroxylamine as a modifying agent.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A process for the manufacture of an aqueous resin composition comprising a phenolic formaldehyde resin, which process comprises the steps of
   a. providing a formaldehyde and phenolic compound,
   b. reacting said compounds in a condensation reaction in the presence of a catalyst,
   c. after completion of the condensation reaction to react with free formaldehyde, determining the free formaldehyde content of the resin composition,
   d. adding a pre-calculated substantially stoichiometric amount of modifying compound,
   wherein the modifying compound is hydroxylamine and is present in an amount between 0.1 and 10 wt % relative to the total weight of the aqueous resin composition, or
   wherein the modifying compound is glycine and is present in an amount between 0.1 and 5.0 wt % relative to the total weight of the aqueous resin composition, and
   e. optionally distillation of the reaction product.

2. The process according to claim 1, wherein the process further comprises at least one of the following:
   (i) cooling the resulting reaction product to a temperature below 50° C.,
   (ii) distilling to concentrate the resin, and wherein the modifying compound is added before, during or after (i) or (ii), and reacting the modifying compound between 45-65° C. for 15-60 minutes.

3. The process according to claim 1, wherein the modifying compound has a solubility in water at 20° C. of at least 25 g/L.

4. The process according to claim 1, wherein the phenolic compounds are hydroxy (poly)aromatic compounds, and wherein the aldehyde compounds are compounds of the general formula RC(=O)H, wherein R is hydrogen or substituted or unsubstituted hydrocarbon.

5. The process according to claim 1, wherein the catalyst comprises at least one of: lithium hydroxide, potassium hydroxide, barium hydroxide, calcium hydroxide, sodium hydroxide and mixes thereof or an organic catalyst comprising at least one of ammonia and an amine.

6. The process according to claim 1, wherein the molar ratio of formaldehyde to phenolic compound is between 0.9 and 3.0.

7. The process according to claim 4, wherein the phenolic compounds are hydroxy (poly)aromatic compounds comprising at least one of phenol, resorcinol and cresol.

* * * * *